United States Patent
Jeon et al.

(10) Patent No.: US 12,417,613 B2
(45) Date of Patent: Sep. 16, 2025

(54) IMAGE CONVOLUTION METHOD IN HYPERBOLIC SPACE

(71) Applicant: GIST(Gwangju Institute of Science and Technology), Gwangju (KR)

(72) Inventors: Hae Gon Jeon, Gwangju (KR); Jin Hwi Park, Gwangju (KR); In Hwan Bae, Gwangju (KR)

(73) Assignee: GIST(Gwangju Institute of Science and Technology), Gwangju (KR)

( * ) Notice: Subject to any disclaimer, the term of this patent is extended or adjusted under 35 U.S.C. 154(b) by 516 days.

(21) Appl. No.: 17/813,963

(22) Filed: Jul. 21, 2022

(65) Prior Publication Data

US 2023/0043037 A1    Feb. 9, 2023

(30) Foreign Application Priority Data

Jul. 22, 2021   (KR) .................. 10-2021-0096529

(51) Int. Cl.
*G06V 10/00*    (2022.01)
*G06V 10/75*    (2022.01)
*G06V 10/82*    (2022.01)

(52) U.S. Cl.
CPC ............ *G06V 10/751* (2022.01); *G06V 10/82* (2022.01)

(58) Field of Classification Search
CPC ....... G06V 10/751; G06V 10/82; G06V 10/77
See application file for complete search history.

(56) References Cited

FOREIGN PATENT DOCUMENTS

CN          112287126 A   *  1/2021  ............. G06N 3/045

OTHER PUBLICATIONS

Chami et al, Hyperbolic Graph Convolutional Neural Networks, Advances in Neural Information Processing Systems 32 (NeurIPS) (Year: 2019).*
Gulcehre et al, Hyperbolic Attention Networks, arXiv:1805.09786v1 (Year: 2018).*
Ines Chami et al., "Hyperbolic Graph Convolutional Neural Networks," Stanford University, pp. 1-20, Oct. 30, 2019.

* cited by examiner

*Primary Examiner* — Ping Y Hsieh
*Assistant Examiner* — Xiao Liu
(74) *Attorney, Agent, or Firm* — Studebaker Brackett PLLC

(57) ABSTRACT

A method for performing image convolution by considering a hierarchical relationship of hyperbolic feature vectors in a hyperbolic space is provided. The method includes steps of embedding an image feature vector on a Euclidean space into a hyperbolic feature vector on a hyperbolic space, allocating a hierarchical weight on the hyperbolic feature vector based on a hierarchical property of the hyperbolic feature vector, and convolutioning the hyperbolic feature vector by applying the hierarchical weight.

7 Claims, 7 Drawing Sheets

IMAGE CONVOLUTION METHOD IN HYPERBOLIC SPACE

CROSS-REFERENCE TO RELATED APPLICATIONS

This application claims the priority of Korean Patent Application No. 10-2021-0096529 filed on Jul. 22, 2021, in the Korean Intellectual Property Office, the disclosure of which is incorporated herein by reference.

BACKGROUND OF THE INVENTION

Field of the Invention

The present disclosure relates to a method for performing image convolution by considering a hierarchical relationship between hyperbolic feature vectors in a hyperbolic space.

Description of the Related Art

Recently, in a deep learning field using a convolutional neural network (CNN), a data learning method in a hyperbolic space has been highlighted because of effective formation of a hierarchical relationship.

In particular, as a need for deep learning on graph-structured data that may represent a relationship between data is on the rise, a data learning method considering a hierarchical relationship is emerging as a core research field to keep pace with the explosive growth of an AI field.

However, the data learning method in the hyperbolic space studied so far has a limit to be applied only to fields designed so that data itself has a hierarchical structure, such as a knowledge graph or a synonym hierarchy, and thus there was a problem of low usability in a computer vision field.

The above-described technical configuration is the background art for helping in the understanding of the present invention, and does not mean a conventional technology widely known in the art to which the present invention pertains.

SUMMARY OF THE INVENTION

An object of the present disclosure is to provide an image convolution method capable of allocating importance to each pixel constituting a hyperbolic feature vector in consideration of a hierarchical relationship between hyperbolic feature vectors embedded on a hyperbolic space.

The objects of the present disclosure are not limited to the above-mentioned objects, and other objects and advantages of the present disclosure, which are not mentioned, will be understood through the following description, and will become apparent from the embodiments of the present disclosure. In addition, it will be appreciated that the objects and advantages of the present disclosure will be easily realized by those skilled in the art based on the appended claims and a combination thereof.

According to an aspect of the present disclosure, there is provided an image convolution method in a hyperbolic space including steps of embedding an image feature vector on a Euclidean space into a hyperbolic feature vector on a hyperbolic space, allocating a hierarchical weight on the hyperbolic feature vector based on a hierarchical property of the hyperbolic feature vector, and convolutioning the hyperbolic feature vector by applying the hierarchical weight.

In one embodiment, the embedding step may include embedding each pixel constituting the image feature vector on the hyperbolic space through a mapping function.

In one embodiment, the embedding step may include embedding the image feature vector into the hyperbolic feature vector on a Poincaré ball through a one-to-one correspondence function connecting the Euclidean space and the Poincaré ball.

In one embodiment, the allocating of the hierarchical weight may include allocating the hierarchical weight based on a geodesic distance of the hyperbolic feature vector.

In one embodiment, the allocating of the hierarchical weight may include allocating a hierarchical weight inversely proportional to the geodesic distance of the hyperbolic feature vector.

In one embodiment, the allocating of the hierarchical weight may include allocating the hierarchical weight based on a distance between a reference pixel and remaining pixels constituting the hyperbolic feature vector.

In one embodiment, the allocating of the hierarchical weight may include generating a hierarchical weight vector consisting of the hierarchical weight.

In one embodiment, the allocating of the hierarchical weight may include rearranging the hyperbolic feature vector according to the hierarchical weight, and arranging the hierarchical weight in the rearrangement order to generate a hierarchical weight vector.

In one embodiment, the allocating of the hierarchical weight may include rearranging the hyperbolic feature vector in the size order of the hierarchical weight, and generating a hierarchical weight vector arranged in the size order of the hierarchical weight.

In one embodiment, the convolutioning step may include multiplying the hyperbolic feature vector by the hierarchical weight vector consisting of the hierarchical weight, and convolutioning the hyperbolic feature vector multiplied by the hierarchical weight vector.

According to the present disclosure, by allocating a hierarchical weight to each pixel constituting a hyperbolic feature vector, it is possible to give importance to a pixel having high affinity in performing deep learning. Accordingly, it is possible not only to increase a learning effect and learning efficiency of a spatial propagation neural network, but also to significantly improve the learning accuracy for learnable parameters used in deep learning.

In addition, according to the present disclosure, it is possible to rearrange hyperbolic feature vectors according to importance in allocating a weight to a hyperbolic feature vector. Accordingly, the arrangement of pixels in the hyperbolic feature vector may have a tendency, and when the tendency is applied to a convolutional neural network, learning consistency and learning accuracy are improved to establish a robust model.

In addition to the above-described effects, specific effects of the present disclosure will be described together with explanation of specific matters for carrying out the present disclosure.

BRIEF DESCRIPTION OF THE DRAWINGS

The above and other aspects, features and other advantages of the present invention will be more clearly understood from the following detailed description taken in conjunction with the accompanying drawings, in which:

Referring to FIG. 1, an image convolution method in a hyperbolic space to be described below may include embedding an image feature vector on a Euclidean space into a hyperbolic feature vector on a hyperbolic space (S110).

In addition, the image convolution method may include allocating a hierarchical weight on the hyperbolic feature vector based on a hierarchical property of the hyperbolic feature vector (S120). In addition, the image convolution method may include convolutioning the hyperbolic feature vector by applying the previously allocated hierarchical weight (S130).

Each of steps S110 to S130 described above may be programmed and implemented through software, or may also be implemented through hardware including a processing unit such as a graphic processing unit (GPU) and a central processing unit (CPU). Hereinafter, for convenience of description, it is assumed that each of steps S110 to S130 of the present disclosure is performed by a convolution module.

Figure 1:
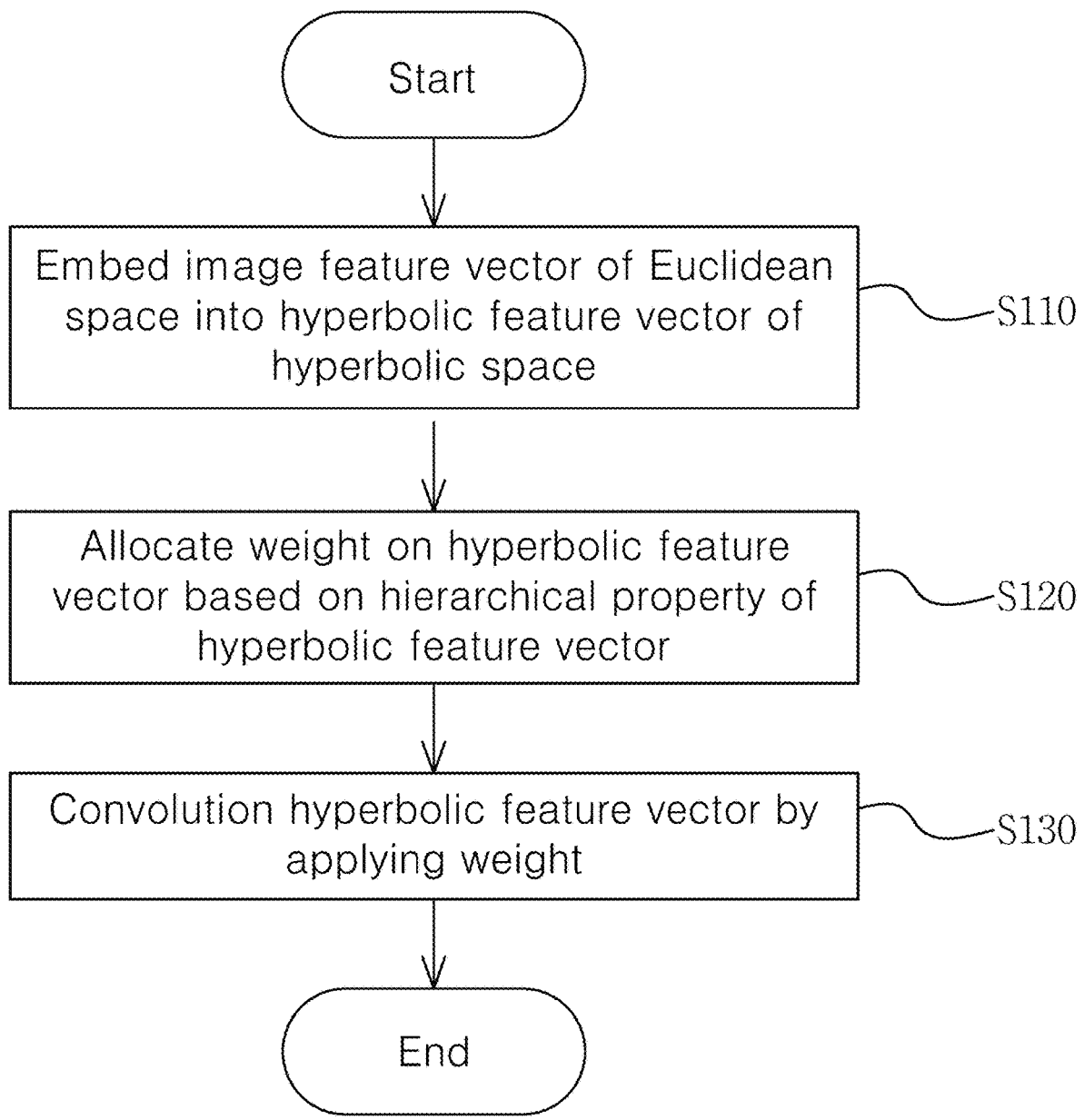
FIG. 1 is a flowchart schematically illustrating an image convolution method of the present disclosure.

Hereinafter, each step illustrated in FIG. 1 will be described in detail.

The convolution module may receive the image feature vector on the Euclidean space and embed the received image feature vector on the hyperbolic space (S110). More specifically, the convolution module may convert the image feature vector located on the Euclidean space into a hyperbolic feature vector located on the hyperbolic space.

The hyperbolic space is a non-Euclidean space, and may be a homogeneous space having a uniform negative curvature at all points on the space. The hyperbolic space may include a multidimensional vector that is difficult to be shaped.

In the following drawings, it is assumed that the hyperbolic space is expressed in a three dimension in order to shape the hyperbolic space. However, as described above, the hyperbolic space may include a multidimensional vector of four or more dimensions.

Figure 2:
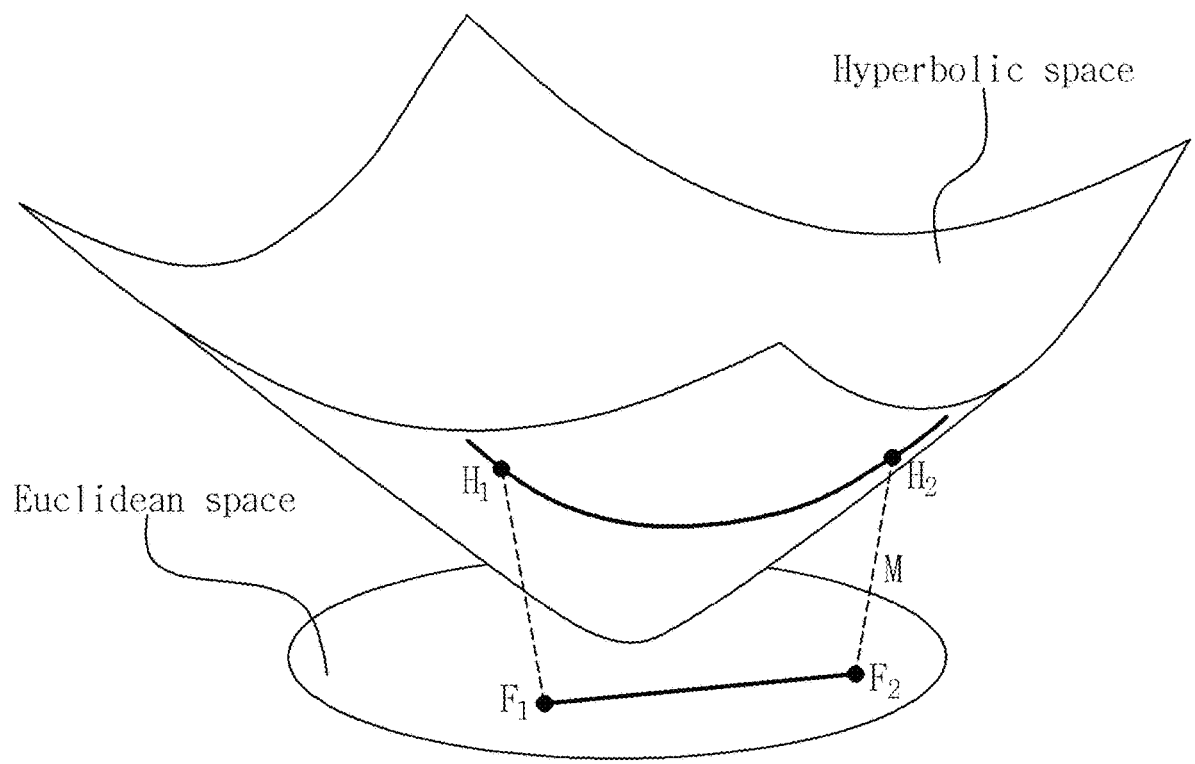
FIG. 2 is a diagram illustrating a state in which two vectors on a Euclidean space are embedded in a hyperbolic space and FIG. 3 is a diagram illustrating a state in which two vectors in a Euclidean space are embedded in a Poincaré ball.

Referring to FIG. 2, the convolution module may embed two image feature vectors F1 and F2 located in a two-dimensional Euclidean space to two hyperbolic feature vectors H1 and H2 located in the hyperbolic space. To this end, the convolution module may use a mapping function M.

The mapping function M may be a one-to-one correspondence function for mapping a Euclidean space to a hyperbolic space or the hyperbolic space to the Euclidean space. For example, the mapping function M may be defined as a linear function, and in this case, each coefficient constituting the linear function may be a learnable parameter.

Figure 3:
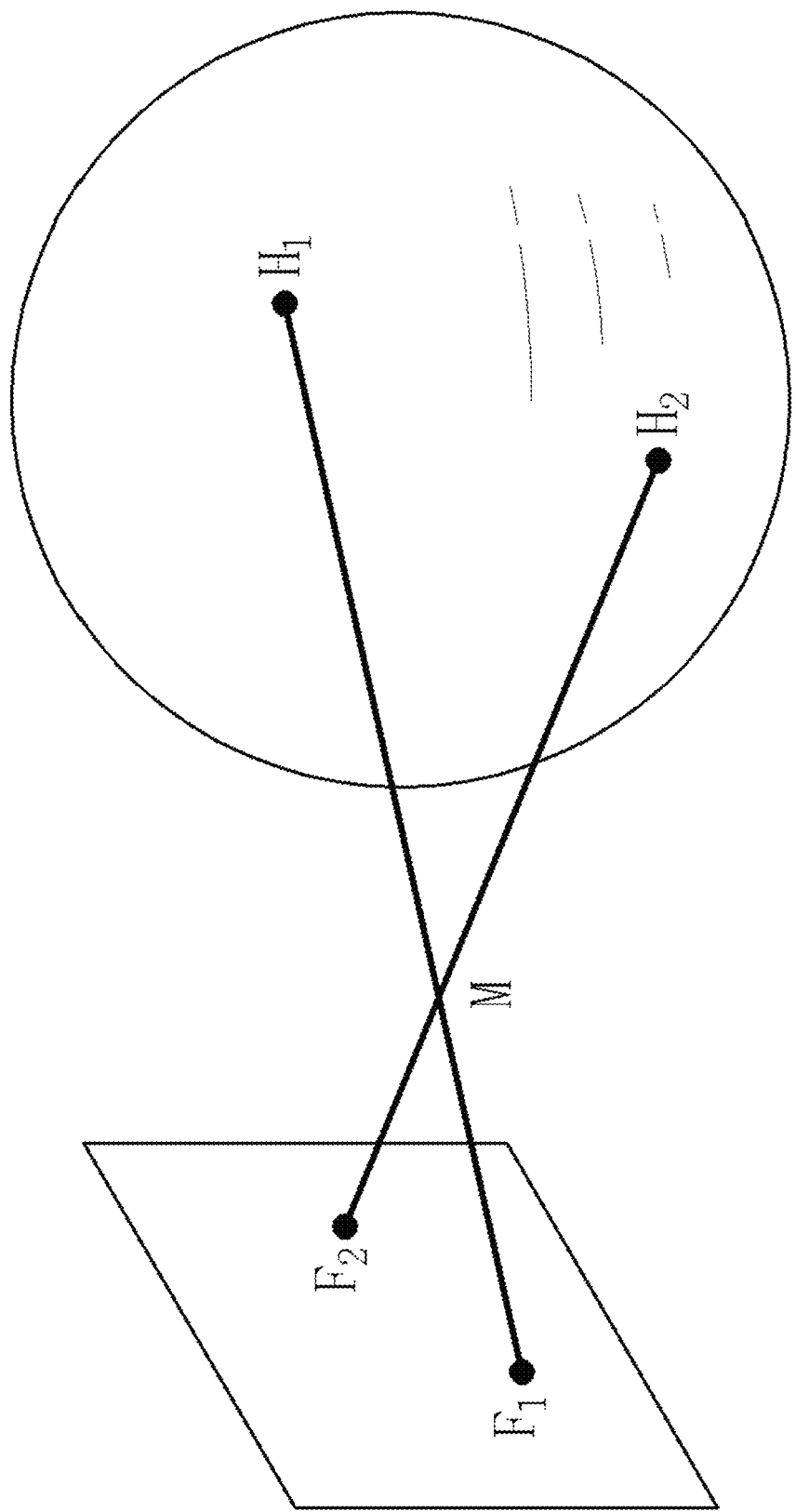

Meanwhile, referring to FIG. 3, the aforementioned hyperbolic space may be modeled as a Poincaré ball. At this time, the convolution module may embed the two image feature vectors F1 and F2 into the hyperbolic feature vectors H1 and H2 on the Poincaré ball through a mapping function M connecting the Euclidean space and the Poincaré ball, specifically, a one-to-one correspondence function. Here, the mapping function M may be defined as a linear function, and in this case, each coefficient constituting the linear function may be a learnable parameter.

Meanwhile, since a multiple operation and a sum operation constituting the mapping function M are performed on the hyperbolic space, Möbius sum operation and multiple operation may be used. More specifically, the Möbius multiple operation may be expressed as in [Equation 1] below, and the Möbius sum operation may be expressed as in [Equation 2] below.

$$M' \otimes_\kappa u = (1/\sqrt{\kappa})\tanh\left(\frac{\|Mu\|}{\|u\|}\tanh^{-1}(\sqrt{\kappa}\|u\|)\right)\frac{Mu}{\|Mu\|} \quad \text{[Equation 1]}$$

(M' represents a matrix, u represents a vector, k represents a curvature of a Poincaré ball, and $\|\cdot\|$ represents a Euclidean norm)

(M represents a matrix, u represents a vector, k represents a curvature of a Poincaré ball, and $\|\cdot\|$ represents a Euclidean norm)

$$u \otimes_\kappa v = \frac{(1 + 2\kappa\langle u, v\rangle + \kappa\|v\|^2)u + (1 - \kappa\|u\|^2)v}{1 + 2\kappa\langle u, v\rangle + \kappa^2\|u\|^2\|v\|^2} \quad \text{[Equation 2]}$$

(u and v represent vectors, k represents a curvature of a Poincaré ball, and $\langle \cdot, \cdot \rangle$ represents a Euclidean inner product)

As described above, when the embedding is completed, the convolution module may allocate the hierarchical weight on the hyperbolic feature vector based on the hierarchical property of the hyperbolic feature vector (S120).

Here, the hierarchical property is a property of similarity and/or affinity between the hyperbolic feature vectors. More specifically, the hierarchical property may include any parameter indicating any value or degree regarding the similarity and/or affinity of the vectors on the hyperbolic space.

In the mapping function M described in step S110, the hyperbolic feature vectors are uniformly distributed on the hyperbolic space, such that the image feature vectors are arranged on a regular grid in the Euclidean space. However, since the hyperbolic feature vector is projected into a manifold space through dimensionality reduction for data visualization, the above-described premise may not be satisfied. Accordingly, when the hyperbolic feature vector is convolutioned without additional data processing, there is a problem in that non-Euclidean spatial characteristics are not faithfully reflected.

In order to alleviate this problem, the convolution module may allocate the hierarchical weight to each hyperbolic feature vector based on a geodesic distance of the hyperbolic feature vector.

Figure 4:
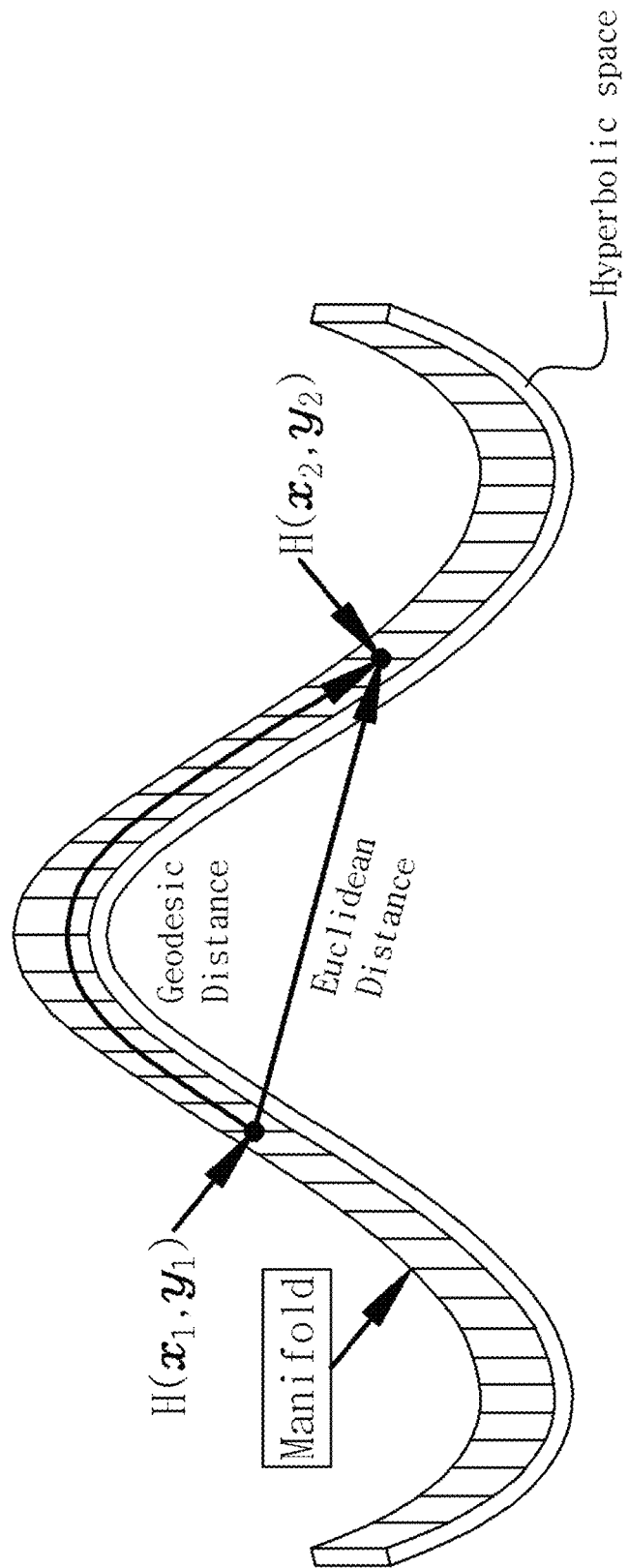
FIG. 4 is a diagram for describing a geodesic distance on a hyperbolic space.

Referring to FIG. 4, the geodesic distance in the hyperbolic space may be different from a Euclidean distance in the Euclidean space. The Euclidean distance may mean a linear distance between two pixels H(x1, y1) and H(x2, y2), whereas the geodesic distance may mean a curved distance passing through the surface of a hyperboloid.

The convolution module may calculate a hyperbolic feature vector embedded on the hyperbolic space, specifically, a geodesic distance between respective pixels constituting the hyperbolic feature vector, and allocated a hierarchical weight according to the calculated distance.

Figure 5:
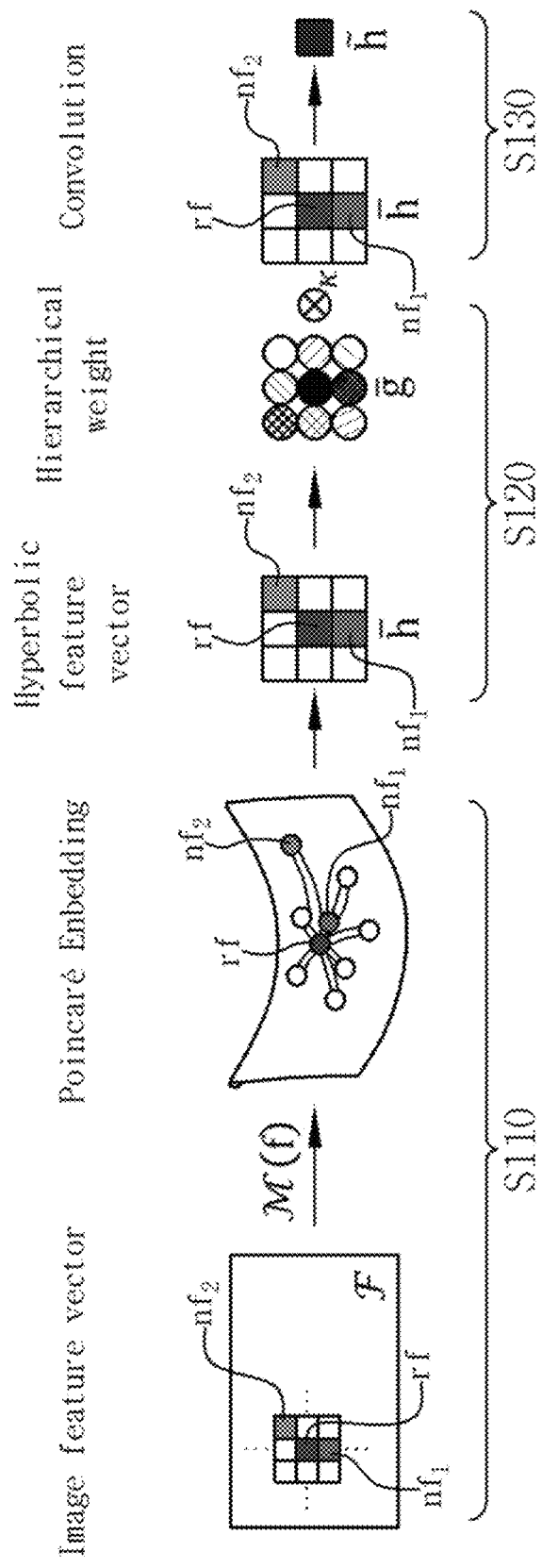
FIG. 5 is a flowchart illustrating an image convolution method in a hyperbolic space according to an embodiment of the present disclosure and FIG. 6 is a flowchart illustrating an image convolution method in a hyperbolic space according to another embodiment of the present disclosure.

Referring to FIG. 5 as an example, the image feature vector in the Euclidean space may be embedded as a hyperbolic feature vector $\bar{h}$ on the Poincaré ball by the mapping function M. Accordingly, the image feature vector in which a distance from an adjacent pixel has been normalized may be mapped to a hyperbolic feature vector $\bar{h}$ having different distances from the adjacent pixel.

The convolution module may calculate a geodesic distance between the respective pixels in the hyperbolic feature vector $\bar{h}$, and allocate a hierarchical weight to each pixel based on the calculated distance.

The geodesic distance may be calculated according to [Equation 3] below.

$$d_\kappa(u, v) = \frac{2}{\sqrt{\kappa}}\tanh^{-1}\left(\sqrt{\kappa}\|(-u)\otimes_\kappa v\|\right) \quad \text{[Equation 3]}$$

(dk represents a geodesic distance, u and v represent two points on the Poincaré ball, k represents a curvature of the Poincaré ball, and $\|\cdot\|$ represents a Euclidean norm)

The closer the geodesic distance between hyperbolic feature vectors in the hyperbolic space, the higher the affinity between respective pixels. In the neural network using spatial propagation, neural network learning may be performed in consideration of such affinity.

The convolution module of the present disclosure may give higher importance to a pixel having high affinity in order to improve the learning efficiency of a spatial propagation neural network (SPN). To this end, the convolution module may allocate a hierarchical weight that is inversely proportional to the geodesic distance between the hyperbolic feature vectors $\bar{h}$. In this case, the hierarchical weight may be normalized to be inversely proportional to the geodesic distance.

Hereinafter, step S120 of allocating the hierarchical weight to the hyperbolic feature vectors $\bar{h}$ will be described in detail with reference to FIG. 5.

The convolution module may allocate a hierarchical weight based on a distance between a reference pixel rf and the remaining pixels of constituting the hyperbolic feature vector $\bar{h}$. For example, the convolution module may set a dimgray pixel illustrated in FIG. 5 as the reference pixel rf, and may calculate a distance between the reference pixel rf and the remaining pixels nf.

Referring to the positions of pixels embedded in the Poincaré ball, a geodesic distance between a dimgray reference pixel rf and a darkgray pixel $nf_1$ may be the shortest, and a geodesic distance between the dimgray reference pixel rf and an lightgray pixel $nf_2$ may be the longest.

Since the geodesic distance from the dimgray reference pixel rf is 0, the convolution module may set the hierarchical weight for the dimgray reference pixel rf to a maximum value, and since the distance from the darkgray pixel $nf_1$ is closer than the distance from the lightgray pixel $nf_2$, the hierarchical weight for the darkgray pixel $nf_1$ may be set higher than the hierarchical weight for the lightgray pixel $nf_2$.

The convolution module may generate a hierarchical weight vector $\bar{g}$ consisting of a hierarchical weight for each pixel.

A method of generating the hierarchical weight vector $\bar{g}$ will be described with reference to FIG. 5 again. In FIG. 5, for convenience of description, the size of the hierarchical weight is expressed as a shade that becomes darker in proportion to the size of the hierarchical weight.

The convolution module may generate a hierarchical weight vector $\bar{g}$ having the same size (width and height) as the hyperbolic feature vector $\bar{h}$. For example, as illustrated in FIG. 5, when the hyperbolic feature vector $\bar{h}$ is in the form of a 3×3 matrix, the hierarchical weight vector may also have the form of a 3×3 matrix. In this case, the hierarchical weight vector $\bar{g}$ may consist of pixel values indicating the hierarchical weight of each pixel in the hyperbolic feature vector $\bar{h}$.

As described above, since the hierarchical weight of the dimgray reference pixel rf (row 2 column 2) is the maximum, in FIG. 5, the pixel value of row 2 column 2 of the hierarchical weight vector $\bar{g}$ may be set highest. In addition, since the hierarchical weight of the darkgray pixel $nf_1$ (row 3 column 2) is the second highest, the pixel value of row 3 column 2 of the hierarchical weight vector g may be set second highest. Meanwhile, since the hierarchical weight of the lightgray pixel $nf_2$ (row 1 column 3) is the minimum, the pixel value of row 1 column 3 of the hierarchical weight vector $\bar{g}$ may be set lowest.

As described above, the convolution module may generate a hierarchical weight vector $\bar{g}$ corresponding to each hyperbolic feature vector $\bar{h}$ using the hierarchical weight allocated based on the geodesic distance.

According to the present disclosure, by allocating the hierarchical weight to the hyperbolic feature vector $\bar{h}$ by the above-described method, it is possible to set higher importance of a pixel having a close geodesic distance, that is, high affinity. Accordingly, according to the present disclosure, it is possible not only to increase the learning effect and the learning efficiency of the spatial propagation neural network, but also to greatly improve the learning accuracy for a learnable parameter in a filter and/or kernel used for convolution.

Meanwhile, according to the method of allocating the hierarchical weight described with reference to FIG. 5, respective pixel values in the hierarchical weight vector $\bar{g}$ may be randomly disposed according to a hierarchical property of the hyperbolic feature vector $\bar{h}$. Specifically, unlike those illustrated in FIG. 5, if the geodesic distance between the dimgray reference pixel rf and the darkgray pixel $nf_1$ is the longest, a pixel value in row 3 column 2 of the hierarchical weight vector $\bar{g}$ may be set lowest. Due to the randomness of the hierarchical weight vector $\bar{g}$, there is a limit that the learning consistency of deep learning may be somewhat lowered.

In order to solve the above-mentioned potential problems, the convolution module may rearrange a hyperbolic feature vector $\bar{h}$ according to the hierarchical weight (S121), and may generate a hierarchical weight vector $\bar{g}$ by arranging hierarchical weights according to the rearrangement order (S122).

Hereinafter, another method of generating the hierarchical weight vector g will be described with reference to FIG. 6. Even in FIG. 6, for convenience of description, the size of the hierarchical weight is expressed as a shade that becomes darker in proportion to the size of the hierarchical weight.

As described with reference to FIG. 5, the convolution module may determine a hierarchical weight for each pixel based on the hierarchical property, for example, the geodesic distance between pixels constituting the hyperbolic feature vector $\bar{h}$.

Then, the convolution module may rearrange the hyperbolic feature vector $\bar{h}$ in the size order of the hierarchical weight. More specifically, the convolution module may rearrange the positions of pixels in the hyperbolic feature vector $\bar{h}$ in the increasing or decreasing order of the hierarchical weight.

Figure 6:
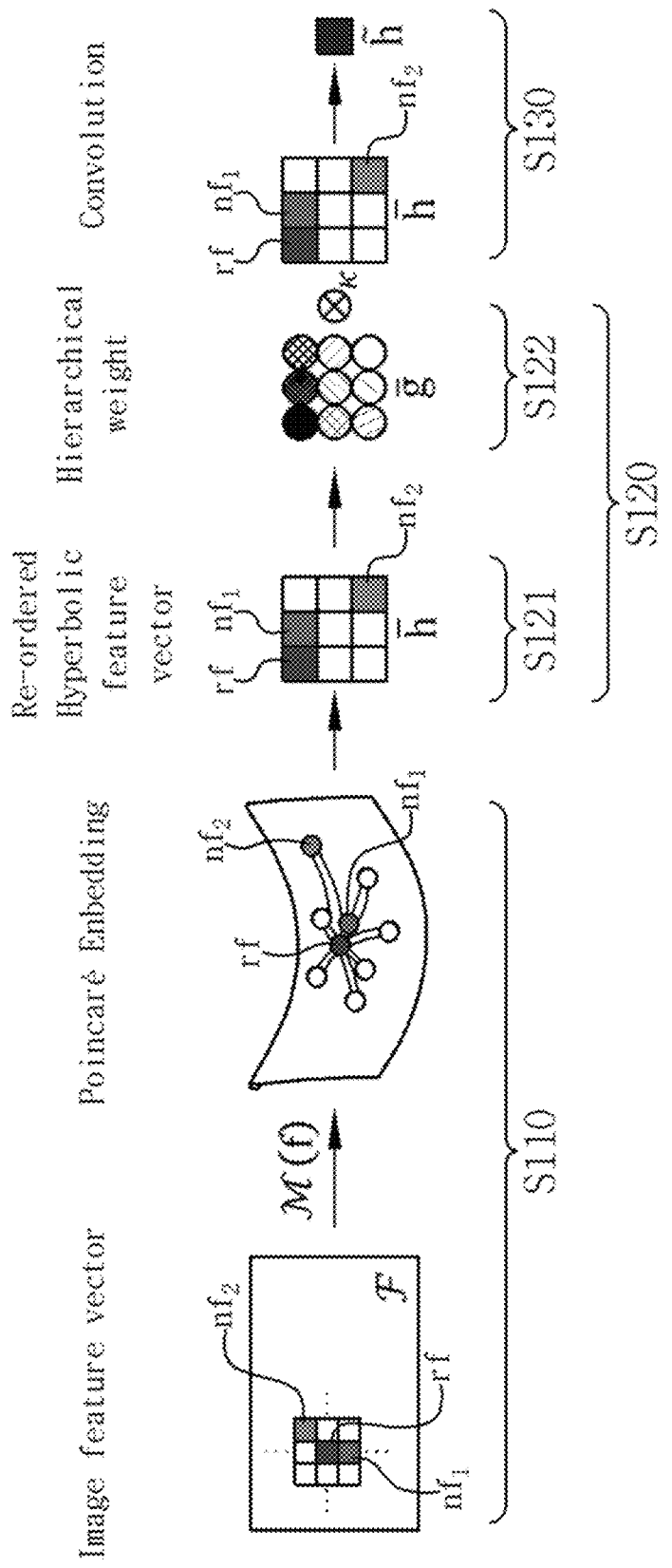

Referring to FIG. 6, based on the geodesic distance on the Poincaré ball above, the weight for the dimgray reference pixel rf may be set largest, and the weight for the darkgray pixel $nf_1$ may be set second largest. Meanwhile, the weight of the lightgray pixel $nf_2$ may be set to the smallest.

At this time, the convolution module may arrange each pixel of the hyperbolic feature vector $\bar{h}$ consisting of 3 rows and 3 columns in the increasing order of the hierarchical weight from row 1 column 1 to row 1 column 3, from row 2 column 1 to row 2 column 3, and from row 3 column 1 to row 3 column 3. Accordingly, as illustrated in FIG. 6, the dimgray reference pixel rf having the largest hierarchical weight may be disposed in row 1 column 1, the darkgray pixel $nf_1$ having the second largest hierarchical weight may be disposed in row 1 column 2, and the lightgray pixel $nf_2$ having the smallest hierarchical weight may be disposed in row 3 column 3.

Unlike those described above, the convolution module may rearrange each pixel in the decreasing order of the hierarchical weight, and may also arrange the pixels in the order from row 1 column 1 to row 3 column 1, from row 1 column 2 to row 3 column 2, and from row 1 column 3 to row 3 column 3.

Then, the convolution module may generate a hierarchical weight vector $\bar{g}$ arranged in the increasing or decreasing order of the hierarchical weight. In other words, the convolution module may generate a hierarchical weight vector $\bar{g}$, but each inner pixel value (hierarchical weight) may be arranged in the order of size. In this case, the arrangement direction of pixels in the hierarchical weight vector $\bar{g}$ may be the same as the rearrangement direction of the aforementioned hyperbolic feature vector $\bar{h}$.

Referring back to FIG. 6, the convolution module may arrange each pixel of the hierarchical weight vector g consisting of 3 rows and 3 columns in the increasing order of the value (hierarchical weight). Accordingly, the hierarchical weight corresponding to the dimgray reference pixel rf may be arranged in row 1 column 1, the hierarchical weight corresponding to the darkgray pixel $nf_1$ may be arranged in row 1 column 2, and the hierarchical weight corresponding to the lightgray pixel $nf_2$ may be arranged in row 3 column 3.

As described above, when the allocation of the hierarchical weight and/or the generation of the hierarchical weight vector g are completed, the convolution module may convolution the hyperbolic feature vector by applying the hierarchical weight (S130). More specifically, the convolution module may first apply a hierarchical weight to the hyperbolic feature vector $\bar{h}$ and then convolution the hyperbolic feature vector $\bar{h}$ applied with the hierarchical weight.

Referring to FIGS. 5 and 6, when the hierarchical weight vector $\bar{g}$ is generated as described above, the convolution module may multiply the hyperbolic feature vector $\bar{h}$ by the hierarchical weight vector $\bar{g}$ to apply the hierarchical weight to the hyperbolic feature vector $\bar{h}$. Here, the Möbius multiple operation expressed by the above-mentioned [Equation 1] may be used for the multiple operation.

Then, the convolution module may convolution the hyperbolic feature vector h applied with the hierarchical weight. In this case, various techniques used in the corresponding technical field may be applied to convolution, and in particular, a technique used in a spatial propagation neural network (SPN) may be used.

According to the method of applying the hierarchical weight described with reference to FIG. 6, respective pixel values in the hyperbolic feature vector $\bar{h}$ and the hierarchical weight vector $\bar{g}$ may be arranged regularly according to the size. Accordingly, in an output obtained by multiplying the hyperbolic feature vector $\bar{h}$ by the hierarchical weight vector $\bar{g}$, the pixels may be arranged in the order of importance.

The arrangement of output pixels may have a tendency according to importance, and when the tendency is applied to a convolutional neural network, learning consistency and learning accuracy are improved to establish a robust model.

Figure 7:
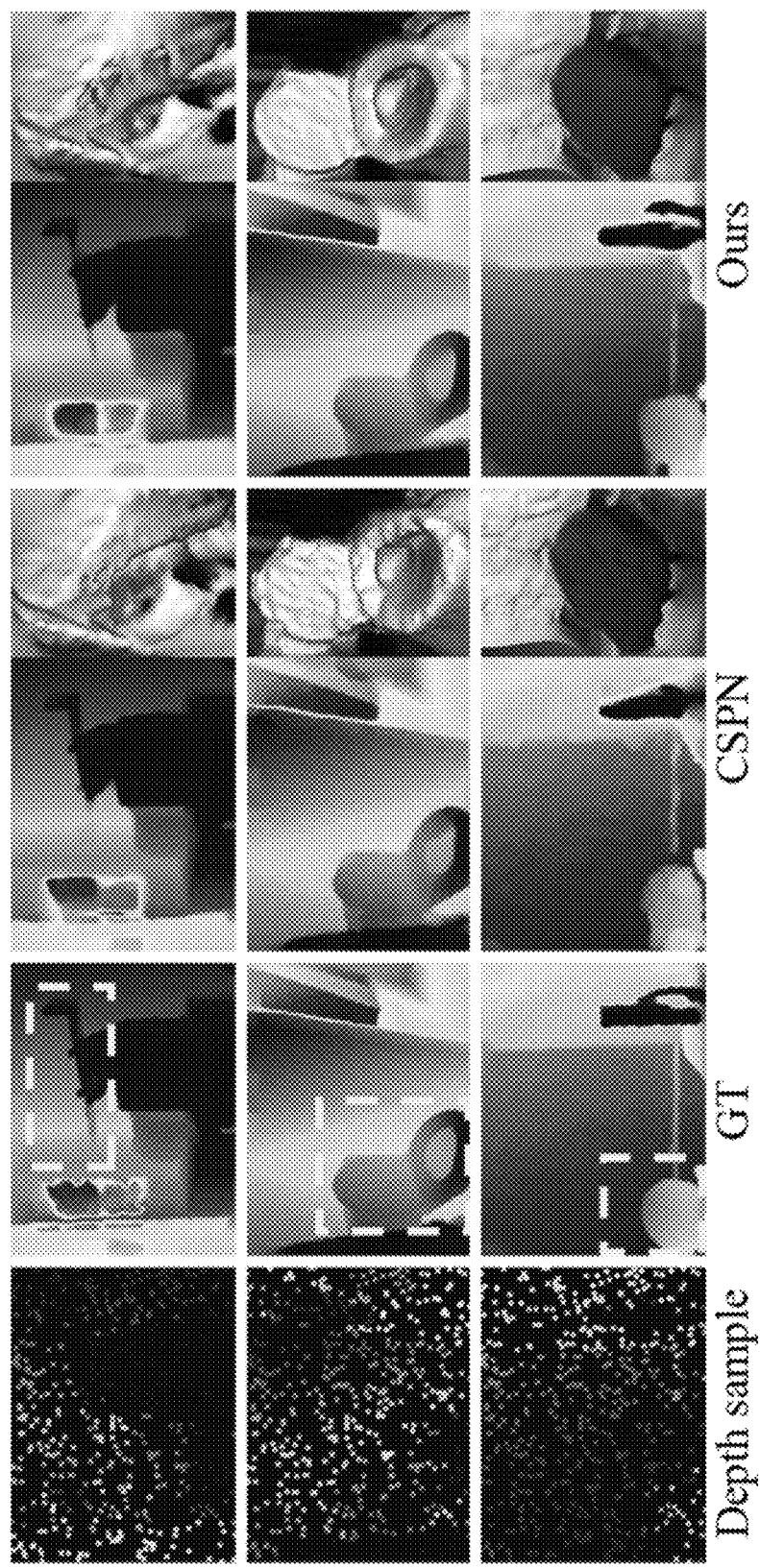
FIG. 7 is a diagram for comparing image reproduction accuracy of the present disclosure and the related art.

Referring to FIG. 7, according to the present disclosure, dense depth information may be generated using sparse depth information through the spatial propagation neural network (SPN). To this end, according to the present disclosure, a depth sample may be received as an image feature vector and embedded on the hyperbolic space.

Then, according to the present disclosure, it is possible to apply a weight to each pixel based on the geodesic distance between pixels in the embedded depth sample, and convolution the hyperbolic feature vector $\bar{h}$ applied with the weight.

In light of the convolution result of the present disclosure illustrated in FIG. 7, when comparing the present disclosure with a convolutional spatial propagation network (CSPN) introduced in "Xinjing Cheng, Peng Wang, and Ruigang Yang. Depth estimation via affinity learned with convolutional spatial propagation network. In Proceedings of European Conference on Computer Vision (ECCV), 2018.", which is a recent remarkable research achievement in a spatial propagation neural network (SPN) field, it can be confirmed that the image reconstructed using the convolution method of the present disclosure is more similar to ground truth (GT).

As described above, the present disclosure has been described with reference to the illustrated drawings, but the present disclosure is not limited to the exemplary embodiments of the present disclosure and the drawings, and it will be apparent that various modifications can be made by those skilled in the art within the scope of the technical idea of the present disclosure. Further, it is natural that even through effects according to the configuration of the present disclosure are not explicitly described while describing the exemplary embodiments of the present disclosure above, expectable effects should be recognized by the configuration.

What is claimed is:

1. An image convolution method in a hyperbolic space performed by a convolution module comprising steps of:
    embedding an image feature vector on a Euclidean space into a hyperbolic feature vector on a hyperbolic space;
    setting a hierarchical weight on the hyperbolic feature vector based on a hierarchical property of the hyperbolic feature vector;
    rearranging the hyperbolic feature vector in the size order of the hierarchical weight;
    generating a hierarchical weight vector arranged in the size order of the hierarchical weight; and
    convolutioning the hyperbolic feature vector after applying the hierarchical weight vector to the hyperbolic feature vector.

2. The image convolution method of claim 1, wherein the embedding step includes embedding each pixel constituting the image feature vector on the hyperbolic space through a mapping function.

3. The image convolution method of claim 1, wherein the embedding step includes embedding the image feature vector into the hyperbolic feature vector on a Poincaré ball through a one-to-one correspondence function connecting the Euclidean space and the Poincaré ball.

4. The image convolution method of claim 1, wherein the setting of the hierarchical weight includes setting the hierarchical weight based on a geodesic distance of the hyperbolic feature vector.

5. The image convolution method of claim 1, wherein the setting of the hierarchical weight includes setting a hierarchical weight inversely proportional to the geodesic distance of the hyperbolic feature vector.

6. The image convolution method of claim 1, wherein the setting of the hierarchical weight includes setting the hierarchical weight based on a distance between a reference pixel and remaining pixels constituting the hyperbolic feature vector.

7. The image convolution method of claim 1, wherein the convolutioning step includes multiplying the hyperbolic feature vector by the hierarchical weight vector consisting of the hierarchical weight, and
    convolutioning the hyperbolic feature vector multiplied by the hierarchical weight vector.

* * * * *